United States Patent Office 3,338,761
Patented Aug. 29, 1967

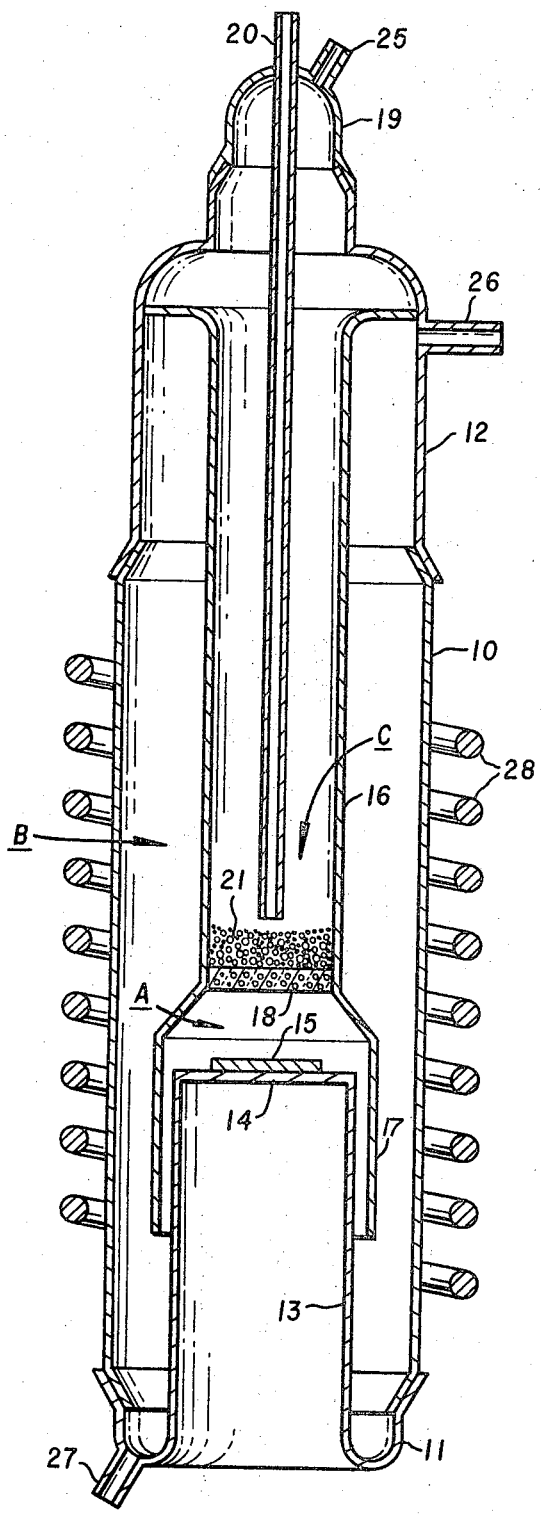

3,338,761
METHOD AND APPARATUS FOR MAKING COMPOUND MATERIALS
Gerald L. Cheney, Dallas, and Paul C. Goundry, Richardson, Tex., assignors to Texas Instruments Incorporated, Dallas, Tex., a corporation of Delaware
Filed Mar. 31, 1965, Ser. No. 444,185
13 Claims. (Cl. 148—175)

This invention relates to a method and apparatus for the vapor phase production of compound materials. More particularly, the invention relates to the epitaxial deposition of Group III–V compound semiconductor materials to form thick, uniform deposits of monocrystalline semiconductor material.

Several methods for the vapor phase production of Group III–V compound semiconductor materials have become known in the art. Typical of these is the reaction of a Group V element halide with a Group III element halide in a decreasing temperature gradient to produce the Group III–V compound by vapor phase reaction. The vapor phase production of Group III–V compounds by this method is described in U.S. Patent No. 3,094,338 to R. E. Johnson et al.

A common characteristic of conventional methods and apparatus for the vapor phase production of Group III–V compounds is the use of a horizontal cylindrical reaction chamber wherein the reactant gases are mixed and then passed through a heated chamber for reaction. The reactants are then passed through a decreasing temperature gradient and the reaction products deposited on the surface of a substrate which is at a lower temperature than the reaction zone.

Several limitations are inherent in the conventional horizontally positioned reactor. For example, the reactant flow stream is horizontal and parallel to the surface of the substrate and uniform temperature control over the length of the reactor is difficult to maintain. Consequently, substrate wafers disposed horizontally within the deposition zone are likely to be at different temperatures or even have a temperature gradient across the length of the wafer, thus resulting in non-uniform deposits.

In the typical conventional reactor, a mixture of hydrogen, hydrogen chloride, and a halide of a Group V element, such as arsenic trichloride is passed over a supply of Group III element, such as gallium or granulated GaAs. The gallium source is maintained at about 1000° C. and a gallium monochloride is formed according to the following reaction:

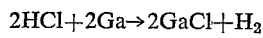

$$2HCl + 2Ga \rightarrow 2GaCl + H_2$$

The GaCl is gaseous and stable above about 900° C., thus is entrained in the gas stream flowing through the reactor. As the gas stream moves through the reactor, the GaCl is mixed with the Group V element gas by gaseous diffusion. The gas stream is then passed through a decreasing temperature gradient wherein the GaCl disproportionates according to the reaction:

$$3GaCl \rightarrow 2Ga + GaCl_3$$

and the free gallium reacts with free Group V elements in the gas stream.

Efficiency of the above-described process is dependent upon two major factors. The GaCl must be thoroughly mixed with the Group V element containing gas and the substrate must be positioned in the lower temperature section of the reactor within the temperature range wherein the Group III and Group V elements combine.

In accordance with the present invention, the reactor is disposed vertically and divided into two chambers by a porous frit member. The gases are combined on the high temperature side of the frit and then forced through the frit. Thus the frit serves to act as a mixing medium which uniformly mixes the reactants in a uniform temperature section which is very short. Furthermore, the frit causes a turbulence on the upstream side of the frit which also aids gaseous mixing. In other words, thorough mixing of the reactants is accomplished in a very small cross-sectional area of the reactor without relying on normal gaseous diffusion in a flowing stream.

The substrate upon which the Group III–V compound is to be deposited is disposed horizontally in the vertical reactor, thus the surface of the substrate is normal to the direction of gas flow. Since the reactants are thoroughly mixed by the frit, the thermal gradient in which disproportionation and recombination reaction takes place can be very abrupt, thus the low temperature surface of the substrate is very near the frit. With the thermal profile of the reactor so compressed, all disproportionation and reaction takes place very near the plane of the substrate wafer, thus the reaction efficiency and deposition rates are vastly increased.

It is an object of this invention to provide a method and apparatus for rapidly producing uniform crystalline deposits of compound semiconductor materials. It is a further object of this invention to provide an apparatus for the vapor phase production of Group III–V compound materials wherein the Group III and Group V elements are thoroughly mixed upon introduction into the appropriately heated reaction zone, thereby avoiding the necessity of transporting the Group III element over a long distance.

A particular advantage of the apparatus of this invention is the complete and thorough mixing of the reactant gases in the reaction zone to assure complete reaction thereof. A further advantage of the invention is the vertical arrangement of the reaction wherein the reaction zone is disposed vertically above the deposition chamber and closely spaced from the surfaces of the substrates upon which the product is to be deposited, thus a plurality of substrates may be disposed within a uniform temperature region closely spaced from the reaction zone. Furthermore, since the reactant gases impinge normal to the surface of the substrate, the deposits formed are highly uniform in composition and thickness.

Other objects, features and advantages of the invention will become more readily understood from the following detailed description taken in conjunction with the appended claims, and attached drawing in which the sole figure is an elevational view in section of the preferred embodiment of the invention.

The vertical reactor shown in the figure comprises a cylindrical body 10 having two fitted end caps 11 and 12. End cap 11 has a hollow cylindrical portion 13 which extends upwardly into the central portion of the tubular reactor 10. The cylindrical portion 13 extending into the reactor has a flat surface 14 upon which the substrate material 15 may be positioned. End cap 11 is also fitted with an exhaust outlet 27.

End cap 12 is mounted at the top of the cylindrical body 10 and carries reaction tube 16 formed therein which extends into the central portion of the cylindrical reaction vessel 10. Reaction tube 16 has a flared portion 17 at its lower end which extends over the recessed cylindrical portion 13 of the bottom end cap 11, thus enclosing substrate wafer 15 within the lower end of the reaction tube 16. The flared portion 17 of the reaction tube 16 extends down from the substrate carrier surface 14 of end cap 11 and acts as a guide to direct gases passing over the substrate wafer 15 downwardly between the walls of the flared portion 17 and the upwardly extending recessed portion 13 of end cap 11.

Reaction tube 16 is appropriately fitted with one or more porous members 18 such as a quartz frit which is parallel to and spaced approximately 1 to 3 centimeters above the surface of the substrate wafer 15. The frit member 18 divides the reaction tube 16 into an upper and lower portion; the lower portion being defined by the flared guide 17, the frit material 18 and the flat substrate carrier surface 14. This portion of the reaction tube is identified in the figure by the general reference character A, and is hereinafter referred to as the deposition chamber. In the preferred embodiment, the frit is partially fused, unvitrified quartz about one-eighth inch thick having a pore size of about 80 to 160 microns.

End cap 12, and the reaction tube 16 formed therein, effectively divide the vertical reactor into essentially three separate chambers, the deposition chamber A, previously described, a flush chamber (defined by the walls of the reaction tube 16 and the cylindrical vessel 10), identified in the figure by the general reference character B, and a mixing chamber (defined by the upper portion of the reaction tube 16 and the frit member 18) identified by the general reference character C.

Reaction tube 16 is appropriately fitted with a cap 19 which carries a feed tube 20 extending therethrough and down into the central portion of the reactor to a point near the frit member 18.

Group III feed material 21, which may be either in compound or pure elemental form is contained within reactor tube 16 adjacent the frit 18. If the feed material is supplied in a compound form which is not liquid at the operating temperature of mixing chamber C, the feed material may be placed directly on the frit as shown in the figure. When the Group III element source is liquid at the operating temperature of the mixing chamber C, it is preferably maintained in a boatlike container (not shown) near the frit.

A gas stream containing a halogen gas is admitted into chamber C through feed tube 20. The halogen gas is allowed to react with the Group III element 21 to produce a Group III element halide which is then transported into the deposition zone A. Typical of this reaction is the gallium monochloride reaction

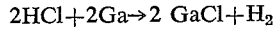

$$2HCl + 2Ga \rightarrow 2\ GaCl + H_2$$

The monohalide formed in the mixing chamber C is stable at high temperatures but disproportionates at lower temperatures according to the reaction

$$3GaCl \rightarrow 2Ga + GaCl_3$$

Thus releasing free Group III elements in the vapor phase available for reaction with free Group V elements.

The Group V constituent is admitted to mixing chamber C through feed tube 20 in the form of a halide. The Group V halide is mixed with the Group III halide in the mixing chamber C by the turbulence created by injecting the gas stream thereinto. The gases are further mixed by being forced through the frit 18.

Cap 19 is further provided with a dilution inlet 25 through which a diluent gas may be added directly into the mixing chamber C. The diluent gas is used to controllably dilute the reactant gases and to provide a carrier medium which aids the flow of reactants downwardly through the reaction tube 16 and through frit 18.

End cap 12 is fitted with flush inlet 26 through which a flush gas may be passed through the flush chamber B. The flush gas entering inlet 26 passes through chamber B between the walls of the cylinder 10 and the reaction tube 16 and downwardly over guide 17 to exit through exhaust 27 provided in the lower end cap 11. The flush gas is primarily used to prevent contamination of the deposition chamber A by backdrafts passing upwardly between the guide 17 and the walls of the recessed portion of end cap 11.

Heating coils 28 are appropriately disposed around the outside of cylinder 10 to controllably maintain the desired temperatures within the reactor. Heating coils 28 may be either RF induction heaters or resistance heaters or any other suitable heating means for controllably maintaining the desired temperatures within the mixing chamber C and deposition chamber A. The heating coils are preferably individually controlled so that the temperature of the mixing chamber C and the deposition chamber A may be separately and individually controlled. The mixing chamber C is maintained at a temperature at which the Group III element monohalide formed therein is stable. By maintaining the mixing chamber at this temperature, the Group III monohalide is thoroughly mixed with the other reactant gases without reacting therewith. The Group V halide fed through inlet 20 is decomposed in the mixing chamber into the Group V element and free halogen, but the free Group V element cannot react with the Group III element since the Group III element is in the stable monohalide form. The gases are further mixed by being forced through the frit member 18, thus, when the reactants enter the deposition chamber they are thoroughly mixed but essentially unreacted.

The temperature of the deposition chamber A is controllably maintained to permit disproportionation of the Group III monohalide and reaction of the Group III and Group V elements. Since the reaction between free gallium and free arsenic in the vapor phase occurs at any temperature between about 200° C. and 820° C., and since GaCl is substantially stable above about 900° C., no deposition of GaAs will occur in the high temperature mixing chamber C. However, by establishing a steep temperature gradient in the deposition chamber A, the monohalide disproportionates and the free gallium and free arsenic react to form GaAs. Furthermore, since the reactants are thoroughly mixed by passing through the frit, the temperature of the deposition chamber may decrease rapidly with distance down from the frit. This steep gradient, or compressed thermal profile, causes the disproportionation and recombination reactions to take place within a short distance of the surface of the substrate 15, thus resulting in highly efficient depositions at very high rates.

For the production of an epitaxial deposit of gallium arsenide upon a gallium arsenide substrate in accordance with the invention, one or more gallium arsenide wafers 15 is suitably prepared and positioned on the flat surface 14 of end cap 11. End cap 11 is fitted onto the cylinder 10 and end cap 12 and cap 19 appropriately fitted on the upper end of the reaction cylinder to form a substantially gas tight reactor. Granulated or crushed gallium arsenide is positioned on the frit 18, and purified helium is flushed through inlets 20, 25 and 26 to purge atmospheric gases from the reactor. Helium is then flushed from the reactor by purging with hydrogen.

When the reactor has been sufficiently purged with hydrogen, the flow of hydrogen through feed tube 20 is stopped while the flow of hydrogen through dilution tube 25 and flush tube 26 is maintained at a rate of approximately 35 cc./minute each. Mixing chamber C and deposition chamber A are then rapidly brought to operating temperature. Arsenic is admitted to the reaction through feed tube 20 in the form of arsenic trichloride ($AsCl_3$) entrained in a carrier of hydrogen bubbled through a bubbler containing liquid $AsCl_3$ at room temperature. The gas thus admitted through feed tube 20 is hydrogen saturated with $AsCl_3$. Upon entering the mixing chamber C the $AsCl_3$ decomposes and GaCl is formed as described above. The reactant gases are then forced downwardly through the frit member and are further mixed and evenly dispersed over the cross-sectional area of the reactor as they proceed downwardly into the deposition chamber A.

The temperature of the substrate 15 is maintained at a lower temperature than the mixing chamber C and frit 18. Thus the mixed reactants pass downwardly through a decreasing temperature gradient.

As the reactants pass through the decreasing temperature gradient, the gallium monochloride disproportionates and the free gallium reacts with the free arsenic to form gallium arsenide which deposits as an epitaxial layer on the surface of the gallium arsenide substrate wafer 15. The spent gases pass downwardly between the guide 17 and the recessed portion of end cap 11 to exit through exhaust outlet 27.

It should be noted that the reactants are thoroughly mixed upon entering the deposition chamber A. Thus when the GaCl disproportionates, free arsenic is available to react with the released gallium without further mixing. The GaCl disproportionates at any temperature below about 900° C. Free gallium and free arsenic react to form GaAs in the vapor phase at any temperature between about 820° C. and 200° C. Consequently, since the reactants are thoroughly mixed upon entering the deposition chamber, the reaction between free gallium and free arsenic will be very efficient and will occur very rapidly. By maintaining the substrate very near the frit 18 and at a temperature below about 820° C. (thus effecting a steep or compressed temperature profile) essentially all of the available GaAs deposits on the substrate surface. Accordingly, the deposition is highly efficient and results in very rapid deposition rates.

Although operation of the vertical reactor has been described with reference to the vapor phase formation of gallium arsenide, it is to be understood that other Group III–V compound semiconductor materials such as indium arsenide, indium phosphide, gallium phosphide and others may also be produced in accordance with the principles of this invention by selection of the appropriate reactants, flow rates and temperatures. Accordingly, the examples given hereinafter are to be taken as exemplary of the preferred embodiment of the invention.

*Example I*

Approximately 30 grams of granulated N-type GaAs was placed on the frit 18 in a vertical reactor as shown in the figure. A 20 mil wafer of N-type GaAs was polished and positioned on the substrate holder 14 and the reactor was assembled and sealed as described above. Helium was flushed through inlets 20, 25 and 26 to remove atmospheric gases. The helium was purged from the reactor with hydrogen.

The flow of hydrogen through the dilution inlet 25 and flush inlet 26 was maintained at 35 cc./minute each. The temperature of the substrate 15 was brought to 800° C. and the GaAs in the mixing chamber heated to 1010° C. Hydrogen saturated with $AsCl_3$ was admitted through feed tube 20 at a rate of 150 cc./minute. A monocrystalline epitaxial deposit of N-type gallium arsenide was deposited on the surface of the substrate 15 at a rate of 3 microns/minute.

Although the invention has been specifically described with reference to the binary compound gallium arsenide, it will be readily understood that the principles of the invention are equally applicable to other compound semiconductors which may be formed by the reaction of a volatile halide of one constituent, such as the trihalides of antimony, arsenic and phosphorous with the disproportionation product of a halide of the other constituent such as monohalides of aluminum, gallium and indium. Furthermore, the principles of the invention may also be utilized to produce mixed composition compound semiconductors. By a mixed composition is meant a compound which is more than one element from a particular group in the Periodic Table are compounded with one or more elements from another group in the Periodic Table while maintaining stoichiometry with respect to periodic group. For example, a mixed composition compound semiconductor compounded from Groups III and V may be represented by the general formula $$A_aB_bC_cD_dE_eF_f$$

where A, B and C represent elements from Group III; D, E and F represent elements from Group V;

$a+b+c=1$, and
$d+e+f=1$, where each lower case subscript represents the number of atoms of the immediately preceding element present in a single molecule of the material represented by the general formula.

In accordance with the invention, mixed composition compounds of the general formula $AD_xE_{(1-x)}$ may be formed by the simultaneous vapor phase reaction of halides of the elements D and E with the disproportionation product of the halide of element A in the apparatus heretofore described.

A typical example of such mixed composition compound semiconductor material is the Group III–V compound $GaAs_xP_{(1-x)}$. It will be understood that the expression $GaAs_xP_{(1-x)}$ is used herein to described a compound wherein gallium is combined with arsenic and phosphorous, the number of atoms of gallium being equal to the number of atoms of arsenic and phosphorous combined. Thus, since Group III elements combined with Group V elements in a ratio of 1:1, the subscript $x$ in the above expression is used to denote the fractional number of atoms of arsenic which is present in a single molecule of $GaAs_xP_{(1-x)}$. For example, substitution of a mixture of $AsCl_3$ and $PCl_3$ in hydrogen for the mixture of $AsCl_3$ and hydrogen described in Example I above will result in the production of an epitaxial deposit of $GaAs_xP_{(1-x)}$ wherein $x$ is directly related to the ratio of $AsCl_3$ to $PCl_3$ in the reactant feed gas admitted to the reactor through feed tube 20. It will be further noted that by the appropriate variation of the concentrations of the Group V halide in the gas mixture admitted through feed tube 20, the composition of the reactant product can be varied during the production thereof, thus permitting either abrupt or gradual change in the composition ranging from pure gallium arsenide to pure gallium phosphide or vice versa. Accordingly, the following examples are to be taken as exemplary of the preferred mode of operation of the invention.

*Example II*

A wafer of N-type GaAs 20 mils thick was polished and positioned on the substrate holder 15 of the reactor described above. A charge of about 30 grams of granulated GaAs was placed on the frit 18 and the system was assembled and sealed. The flow of pure hydrogen through flush inlet 26 and dilution inlet 25 was set at 20 cc./minute each. The temperature of the substrate 15 was brought to 790° C. and the mixing chamber heated to 1010° C. Hydrogen bubbled through liquid $AsCl_3$ at a rate of 135 cc./minute was admitted through inlet 20. Hydrogen bubbled through liquid $PCl_3$ at a rate of 30 cc./minute was also admitted through inlet 20. Under these conditions, a monocrystalline deposit of $GaAs_{0.8}P_{0.2}$ was formed on the substrate at a rate of 2 microns/minute.

*Example III*

A wafer of N-type GaAs 20 mils thick was polished and positioned on the substrate holder 15 of the reactor described above. A charge of about 30 grams of granulated GaAs was placed on the frit 18 and the system was assembled and sealed. The flow of pure hydrogen through flush inlet 26 and dilution inlet 25 was set at 20 cc./minute each. The temperature of the substrate 15 was brought to 770° C. and the mixing chamber heated to 1010° C. Hydrogen bubbled through liquid $AsCl_3$ at a rate of 18 cc./minute was admitted through inlet 20. Hydrogen bubbled through liquid PCl₃ at a rate of 55 cc./minute was also admitted through inlet 20. Under these conditions, a monocrystalline deposit of $GaAs_{0.4}P_{0.6}$ was formed on the substrate at a rate of 3.3 microns/minute.

The mixed composition epitaxial layers formed in the above examples were found to be of high crystalline perfection, substantially free of lattice strains and of low dislocation density. In each instance, the layer formed an extension of the crystalline lattice of the substrate wafer.

It will be understood that the principles of the invention are equally applicable to the vapor phase production of compounds of the general type $A_yB_{(1-y)}D$ and quarternary compounds of the type $A_yB_{(1-y)}D_xE_{(1-x)}$. For example, $In_yGa_{(1-y)}As$ may be produced by simply substituting a mixture or granulated InAs and GaAs for the GaAs source described in Example I. Likewise,

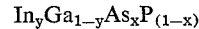

may be produced by the addition of the appropriate reactants in the apparatus described.

Thus it will therefore be understood that the principles applicable to the operation of apparatus and methods described are equally applicable to the production of binary Group III–V compounds and mixed composition Group III–V compounds.

Although particular reference has been made to the Group III–V compound gallium arsenide and gallium phosphide, and the mixed composition compounds $GaAs_xP_{(1-x)}$, it will be appreciated that the principles of this invention are applicable to the production of binary compounds of the Group III elements; aluminum, gallium and indium, with any of the Group V elements; phosphorous, arsenic and antimony, and to the production of ternary and quaternary mixed composition compounds of these Group III and Group V elements.

Although specific reference has been made to methods and apparatus for making Group III–V compounds and mixed composition Group III–V compounds, it will be understood that these terms include both doped and undoped semiconductor materials. Dopants may be added as desired in any of the above-described processes by conventional methods such as by including dopants in the Group III source, in the Group V gas stream, or by injection into either the mixing chamber or the deposition chamber in pure element or compound form.

It is to be understood that the above-described methods and apparatus are merely illustrative of the application of principles of the invention. Numerous other arrangements may be devised by those skilled in the art without departing from the spirit and scope of the invention as defined by the appended claims.

What is claimed is:
1. An apparatus for producing compound materials comprising:
   (a) a vertically disposed reaction tube;
   (b) a porous member dividing said reaction tube into an upper chamber and a lower chamber;
   (c) means for maintaining said upper chamber and said porous member at a first temperature;
   (d) means for maintaining a temperature gradient in said lower chamber, the temperature in said lower chamber decreasing rapidly with distance downward from said porous member, and
   (e) means for introducing into said upper chamber halides of the constituents of the compounds to be produced.

2. An apparatus for producing Group III—V compound semiconductor materials comprising:
   (a) a substantially vertically disposed reaction tube;
   (b) a porous frit dividing said reaction tube into an upper and a lower chamber;
   (c) means for maintaining said upper chamber and said frit at a temperature at which monohalides of Group III elements are substantially stable;
   (d) means for maintaining a temperature gradient across a portion of said second chamber, the highest temperature in said second chamber being no higher than the temperature in said upper chamber and decreasing with distance from said frit, and
   (e) means for introducing Group V elements and halides of Group III elements into said upper chamber.

3. The apparatus of claim 2 and having means for supporting a substrate within said lower chamber.

4. In an apparatus for the vapor phase production of Group III–V compound semiconductor materials, a reaction tube divided into two chambers by a porous member.

5. The reaction tube of claim 4 wherein said porous member is a partially fused, unvitrified quartz frit having a pore size of about 80–160 microns.

6. In the process of making compound materials by vapor phase reaction, the steps of:
   (a) passing the reactants through a porous frit at a first temperature, and
   (b) passing the mixed reactants over a substrate at a second temperature, 7. In the process of making Group III–V compound semiconductor materials, the steps of:
   (a) mixing halides of Group III and Group V elements in a first chamber maintained at a temperature at which the monohalide of the Group III element is stable,
   (b) passing the mixture through a frit, and
   (c) passing the mixture downwardly through a steep temperature gradient.

8. The method of making a Group III–V compound semiconductor material comprising the steps of:
   (a) mixing a Group III element halide with a Group V element halide in a reaction chamber at a temperature of about 1000° C.,
   (b) passing the resultant mixture and the reactant products thereof through a frit, and
   (c) passing said mixture and the reaction products thereof over a substrate at a temperature of about 780° C.

9. The method of making a crystalline deposit of a Group III–V compound semiconductor material comprising the steps of:
   (a) introducing a Group III element halide into a reaction chamber at a temperature of about 1000° C. to about 1050° C.;
   (b) introducing a stream containing a Group V element halide into said reaction chamber, thereby mixing said Group III element halide and said stream within said chamber;
   (c) passing the mixture and reaction products thereof downwardly through a porous frit in said reaction chamber;
   (d) positioning a substrate below said porous frit, the surface of said substrate being substantially normal to the flow of said mixture and said reaction products, and
   (e) maintaining the temperature of said substrate at about 720° C. to about 815° C.

10. The method of making an epitaxial deposit of GaAs on a GaAs substrate comprising the steps of:
   (a) providing a vertically disposed reaction tube having a frit therein which divides said reaction tube into an upper and a lower chamber;
   (b) placing a supply of GaAs in said upper chamber;
   (c) placing a monocrystalline wafer of gallium arsenide in said lower chamber;
   (d) heating said upper chamber and said frit to a temperature of about 1000° C. to about 1050° C.;
   (e) heating said substrate to a temperature of about 720° C. to about 815° C.;
   (f) introducing a gas containing hydrogen and AsCl₃ into said upper chamber; and
   (g) mixing the reactants in said upper chamber by passing said reactants through said frit.

11. The method of making a mixed composition Group III–V compound, wherein the mixed composition compound has the formula $$Al_aGa_bIn_cP_dAs_eSb_f$$

wherein each of $a$, $b$, $c$, $d$, $e$, and $f$ range from zero to one and $a+b+c=1$ and $d+e+f=1$, comprising the steps of:
 (a) providing a vertically disposed reaction tube having a frit therein which divides said reaction tube into an upper and a lower chamber;
 (b) placing a supply of Group III material selected from the group consisting of aluminum, gallium indium and combinations thereof in said upper chamber;
 (c) providing a substrate in said lower chamber;
 (d) heating said upper chamber and said frit to a temperature greater than about 900° C.;
 (e) heating said substrate in said lower chamber to a temperature of about 200° C. to about 820° C.;
 (f) introducing a gas comprising hydrogen and a halide of Group V elements selected from the group consisting of arsenic, phosphorous, antimony and combinations thereof into said upper chamber;
 (g) mixing said gas with said supply of Group III material, thereby producing gaseous Group III element monohalides, and
 (h) passing said gas and the gaseous products mixed therewith in said upper chamber through said frit and into said lower chamber.

12. The method of making an epitaxial deposit of $GaAs_xP_{(1-x)}$ comprising the steps of:
 (a) providing a vertically disposed reaction tube having a frit therein which divides said reaction tube into an upper chamber and a lower chamber;
 (b) placing a supply of GaAs in said upper chamber;
 (c) placing a monocrystalline wafer of GaAs in said lower chamber;
 (d) heating said upper chamber and said frit to a temperature of about 1000° C. to about 1055° C.;
 (e) heating said substrate to a temperature of about 720° C. to about 815° C.;
 (f) introducing a gas containing hydrogen, $AsCl_3$ and $PCl_3$ into said upper chamber, and
 (g) mixing the reactants in said upper chamber by passing said reactants through said frit.

13. An apparatus for the production of compound materials comprising:
 (a) a substantially vertically disposed cylinder enclosed on both ends and having a recessed hollow cylindrical portion extending upwardly into the interior of said cylinder from the bottom thereof;
 (b) a reaction tube disposed within said cylinder and divided into an upper and a lower chamber by a porous frit, the lower end of said reaction tube extending down over the hollow cylindrical portion extending upwardly from the bottom of the cylinder so that the upper surface of said recessed hollow cylindrical portion is parallel to and spaced about 1 to 3 centimeters from said frit;
 (c) means for flushing gas through the space between the wall of said cylinder and the wall of said reaction tube;
 (d) means for introducing a gas containing one of the constituents of the compound to be produced into said upper chamber near said frit;
 (e) means for maintaining said upper chamber at a first temperature, and
 (f) means for controllably maintaining the temperture of said lower chamber at a second temperature which is lower than said first temperature.

References Cited
UNITED STATES PATENTS

| | | | |
|---|---|---|---|
| 2,698,812 | 1/1955 | Schladity | 148—174 |
| 2,916,359 | 12/1959 | Ellis et al. | 23—273 |
| 3,009,834 | 11/1961 | Hanlet | 148—174 |
| 3,097,923 | 7/1963 | Arklers | 23—202 |
| 3,099,579 | 7/1963 | Spityer et al. | 148—175 |
| 3,152,022 | 10/1964 | Christensen et al. | 148—175 |
| 3,297,501 | 1/1967 | Reisman | 148—175 |

DAVID L. RECK, *Primary Examiner.*

N. F. MARKVA, *Assistant Examiner.*